US008659643B2

(12) United States Patent
Purvis et al.

(10) Patent No.: US 8,659,643 B2
(45) Date of Patent: Feb. 25, 2014

(54) COUNTING SYSTEM FOR VEHICLE RIDERS

(75) Inventors: Christopher Purvis, Estacada, OR (US); Paul Beardsley, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 228 days.

(21) Appl. No.: 12/930,857

(22) Filed: Jan. 18, 2011

(65) Prior Publication Data

US 2012/0182390 A1    Jul. 19, 2012

(51) Int. Cl.
*H04N 13/02* (2006.01)
(52) U.S. Cl.
USPC ............................................................ 348/46
(58) Field of Classification Search
None
See application file for complete search history.

(56) References Cited

U.S. PATENT DOCUMENTS

| | | | |
|---|---|---|---|
| 5,793,491 A * | 8/1998 | Wangler et al. | 356/613 |
| 7,382,895 B2 * | 6/2008 | Bramblet et al. | 382/103 |
| 7,508,979 B2 * | 3/2009 | Comaniciu et al. | 382/154 |
| 7,526,120 B2 * | 4/2009 | Gokturk et al. | 382/154 |
| 8,331,654 B2 * | 12/2012 | Abraham et al. | 382/154 |
| 2007/0183651 A1 * | 8/2007 | Comaniciu et al. | 382/154 |
| 2010/0014711 A1 * | 1/2010 | Camhi et al. | 382/104 |
| 2010/0277472 A1 * | 11/2010 | Kaltenbach et al. | 345/419 |
| 2011/0261188 A1 * | 10/2011 | Adarve Lozano | 348/122 |

OTHER PUBLICATIONS

Pavlidis, I.; Symosek, P.; Fritz, B.; Papanikolopoulos, N. "A near-infrared fusion scheme for automatic detection of vehicle passengers," IEEE Workshop on Computer Vision Beyond the Visible Spectrum: Methods and Applications, 1999. (CVBVS '99) Proceedings. pp. 41-48, 1999.*
Gautama, S.; Lacroix, S.; Devy, M.; , "Evaluation of stereo matching algorithms for occupant detection," Proceedings. International Workshop on Recognition, Analysis, and Tracking of Faces and Gestures in Real-Time Systems, 1999. pp. 177-184, 1999.*
Katz ("Fast 3D Object Tracking by Occlusion Analysis of a Priori Known Background" Aug. 30, 2010 (Filing Date of U.S. Appl. No. 61/402,404).*

* cited by examiner

*Primary Examiner* — Dave Czekaj
*Assistant Examiner* — Tyler W Sullivan
(74) *Attorney, Agent, or Firm* — Farjami & Farjami LLP

(57) ABSTRACT

There is provided a system and method for counting riders arbitrarily positioned in a vehicle. There is provided a method comprising receiving, from at least one camera filtered to capture non-visible light, video data corresponding to the vehicle passing through a light source filtered for non-visible light, converting the video data into a 3D height map, and analyzing the 3D height map to determine a number of riders in the vehicle. The camera and light source may be mounted in a permanent position using a gantry or another suitable system where the vehicle travels across the camera and light system in a determined manner, for example through a vehicle track. Multiple cameras may be used to increase detection accuracy. To detect persons in the 3D height map, the analysis may search for height patterns indicating heads and shoulders of persons, compare against height map templates, or use machine-learning methods.

20 Claims, 3 Drawing Sheets

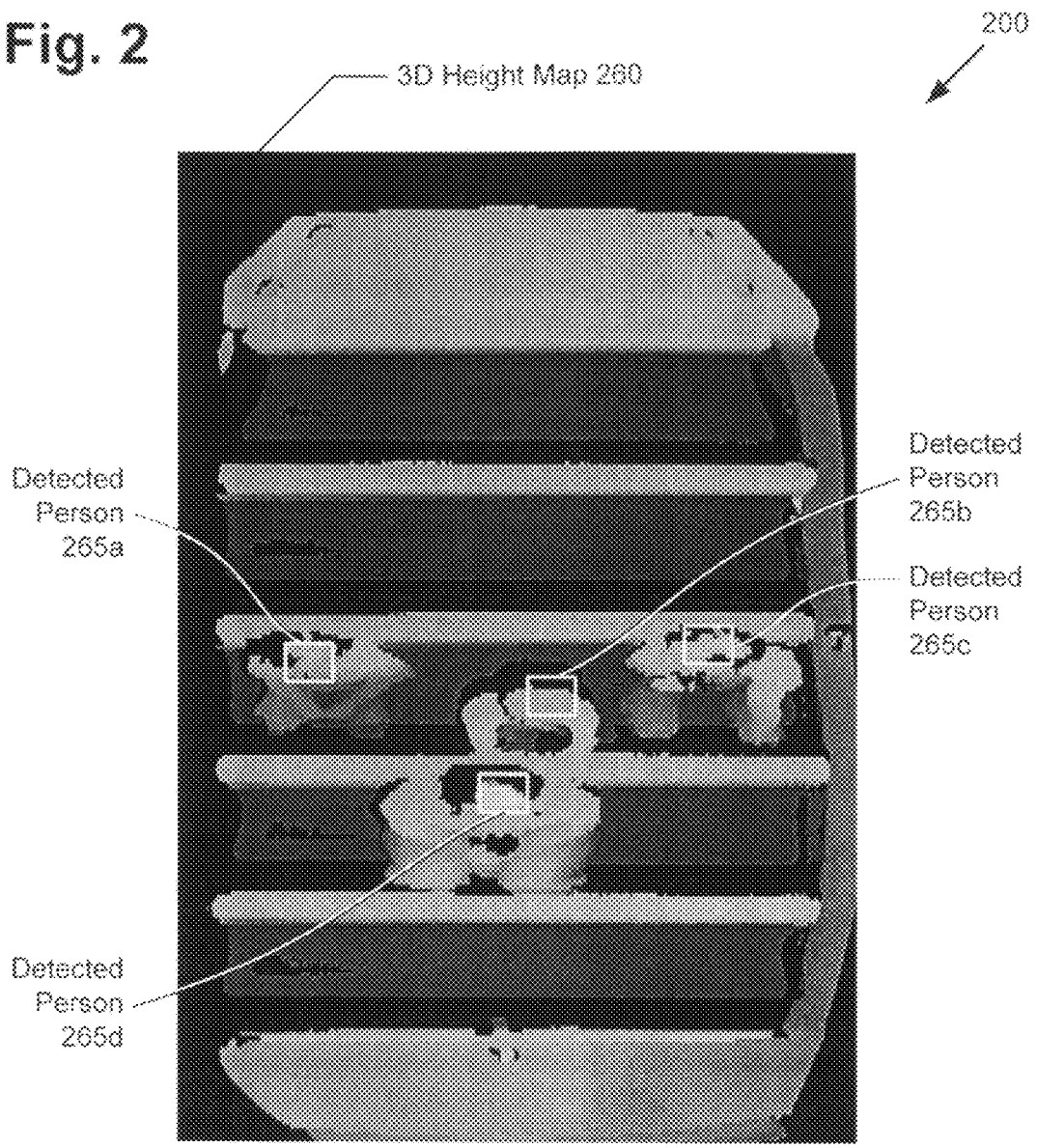

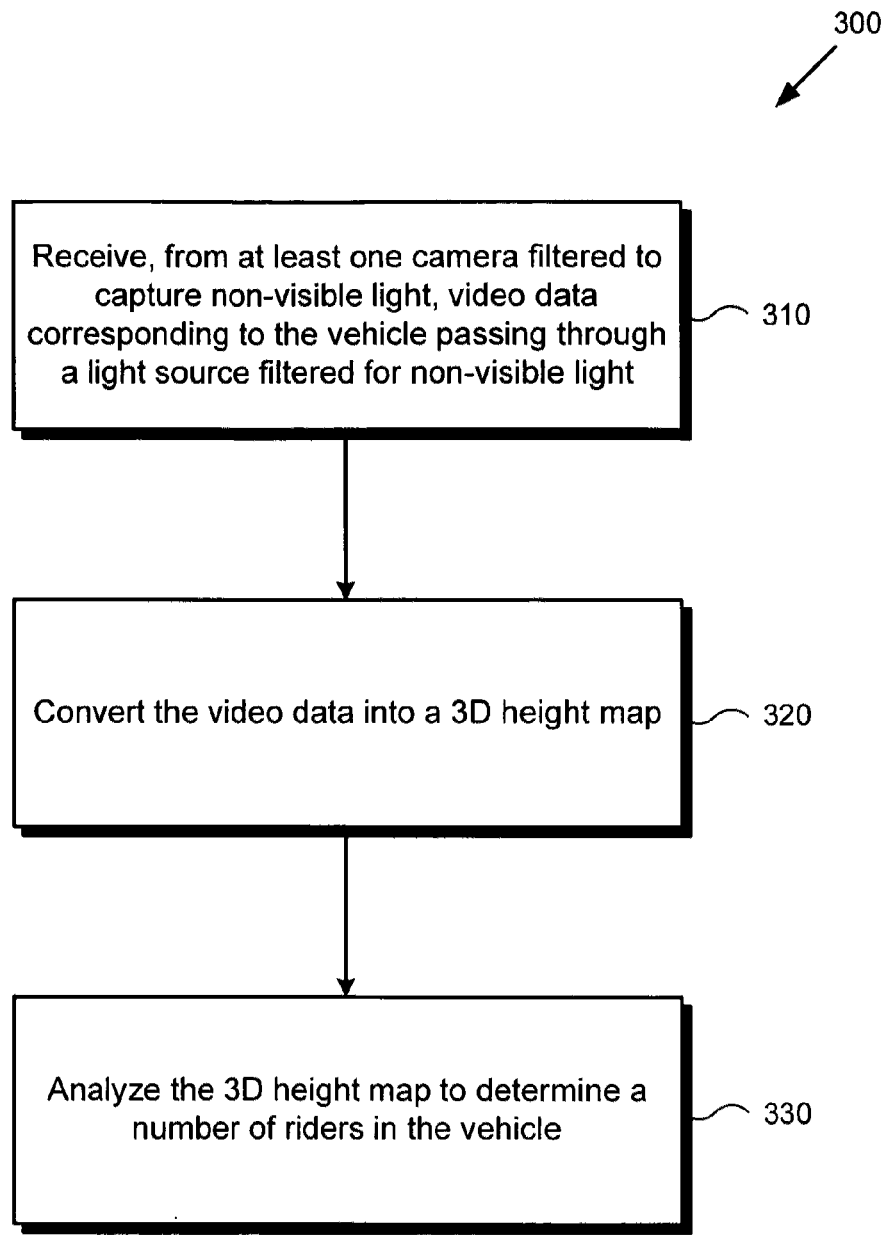

COUNTING SYSTEM FOR VEHICLE RIDERS

BACKGROUND OF THE INVENTION

1. Field of the Invention

The present invention relates generally to automated person counting systems. More particularly, the present invention relates to automated person counting systems for amusement park rides and other vehicles.

2. Background Art

To provide the best service for guests in an entertainment venue such as an amusement park, it is often useful to collect statistical data such as traffic patterns and capacity usage. After collecting and analyzing such statistical data, park operations may be adjusted to provide a more comfortable and enjoyable experience for guests. For example, such statistical data may help to redirect traffic patterns to reduce congestion, to implement queues and cutoffs to alleviate overcrowding, to conduct promotions to fully utilize unused capacity, and to dispatch workers to optimal service positions in the park.

To collect such statistical data, it is necessary to accurately count the number of guests in defined areas. However, to provide sufficient data granularity for useful analysis, each of the defined areas should be relatively small, such as a single vehicle of an amusement park ride attraction supporting several vehicles. Unfortunately, existing methods of counting guests in such vehicular areas are either inaccurate or cost ineffective. For example, in vehicles with free seating arrangements, automated image detection is often unreliable as the guests may be positioned arbitrarily in the vehicle. For example, a child may be sitting on her parent's lap, which may confuse automated image detection systems. Additionally, depending on the seating arrangement and vehicle configuration, persons in front rows may obscure persons in back rows, for example if the persons in the front rows are tall or raise their hands as is common in a rollercoaster ride. Thus, existing automated visual detection systems fail to accurately count persons in a vehicle. While manual counting may provide accurate results, such methods demand high labor costs, particularly for areas with high guest traffic.

Accordingly, there is a need to overcome the drawbacks and deficiencies in the art by providing an accurate and cost effective method of counting guests in defined areas, such as riders in amusement park vehicles.

SUMMARY OF THE INVENTION

There are provided systems and methods for counting riders arbitrarily positioned in a vehicle, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 presents an exemplary 3D height map for counting riders arbitrarily positioned in a vehicle, according to one embodiment of the present invention; and FIG. 3 shows a flowchart describing the steps, according to one embodiment of the present invention, by which riders arbitrarily positioned in a vehicle may be counted.

DETAILED DESCRIPTION OF THE INVENTION

Figure 1:
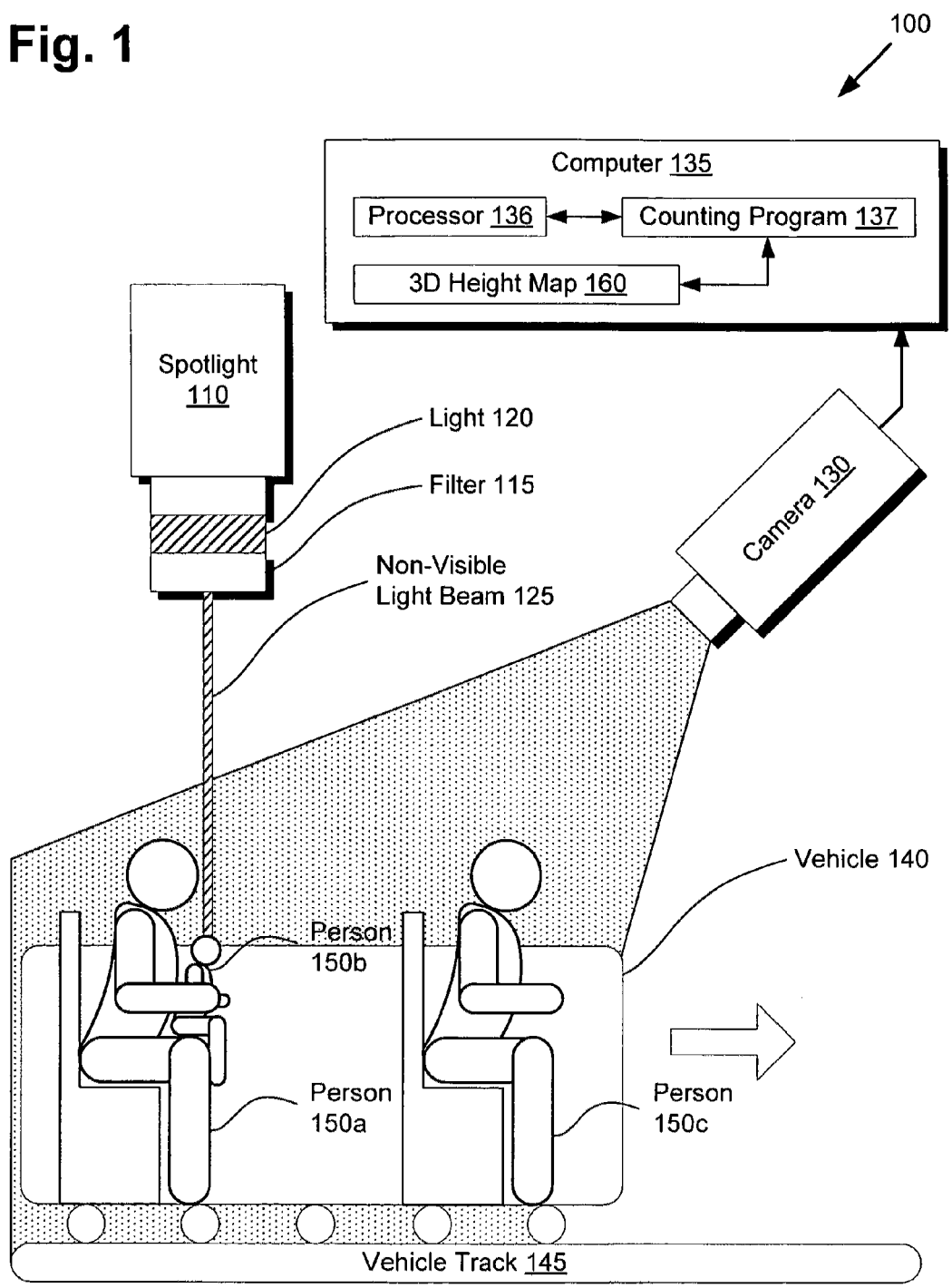
FIG. 1 presents a side view of a system for counting riders arbitrarily positioned in a vehicle, according to one embodiment of the present invention.

The present application is directed to a system and method for counting riders arbitrarily positioned in a vehicle. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

FIG. 1 presents a side view of a system for counting riders arbitrarily positioned in a vehicle, according to one embodiment of the present invention. Diagram 100 of FIG. 1 includes spotlight 110, filter 115, light 120, non-visible light beam 125, camera 130, computer 135, vehicle 140, vehicle track 145, person 150a, person 150b, and person 150c. Computer 135 includes processor 136, counting program 137, and 3D height map 160.

Spotlight 110 may comprise a standard 700 watt incandescent spotlight emitting light 120. Filter 115, which may be fitted directly over spotlight 110, filters light 120 such that only non-visible light passes through, such as infrared light. Filter 115 may also provide a physical filter to focus the light into a structured beam of light, which can be a line of light or a single direction light. For example, a narrow slit may structure light 120 into narrow non-visible light beam 125 across the width of vehicle 140.

Camera 130 may capture vehicle 140 and its occupants while vehicle 140 travels across vehicle track 145. Camera 130 may be configured similarly to spotlight 110 such that only non-visible light is captured, such as infrared light. Advantageously, the riders of vehicle 140 are not blinded by a visible spotlight while sufficient image detail is still retrieved from the non-visible light. Camera 130 may be configured to continuously capture and provide a video data stream to computer 135. Camera 130 and spotlight 110 may be suspended overhead vehicle track 145 using a gentry or another suitable mounting system. While FIG. 1 only utilizes a single overhead camera 130 in front of vehicle 140, in alternative embodiments, multiple cameras may be utilized for increased accuracy. For example, a camera may be placed overhead in front of and behind vehicle 140, two cameras may be placed to the sides of vehicle 140, or another camera configuration may be used.

Computer 135 may comprise any off-the-shelf computer system, such as a desktop or notebook computer, and may continuously receive video data from camera 130 through a direct wired connection or through a wired or wireless network connection. Counting program 137 executing on processor 136 of computer 135 may analyze the video data from camera 130 to generate 3D height map 160. 3D height map 160 may then be utilized by counting program 137 to calculate, with high accuracy, the number of riders or occupants in vehicle 140, described in further detail with FIG. 2 below.

Vehicle 140 may be moving across vehicle track 145 from the left towards the right, as indicated by the direction arrow in FIG. 1. Vehicle 140 may travel along vehicle track 145 at a constant or variable velocity, and counting program 137 may be adjusted to compensate accordingly when receiving the video data stream from camera 130. For ease of discussion, it may be assumed that vehicle 140 travels at a constant velocity. Vehicle 140 may provide a free seating arrangement where riders may position themselves as they see fit. For simplicity, vehicle 140 in FIG. 1 is depicted with only two rows of seats and one column of seated riders; however, the invention is not limited to such a simplified configuration and may be deployed across a wide range of vehicles and rides using any type of seating arrangement. As shown in FIG. 1, person 150c is sitting in the front row, whereas person 150a is sitting in the back row, with person 150b sitting in the lap of person 150a. The system shown in FIG. 1 can accurately count the three persons sitting in vehicle 140 by generating and analyzing the 3D height map 160, as described in further detail below.

Moving to FIG. 2, FIG. 2 presents an exemplary 3D height map for counting riders arbitrarily positioned in a vehicle, according to one embodiment of the present invention. Diagram 200 of FIG. 2 includes 3D height map 260. 3D Height map 260 includes detected person 265a, detected person 265b, detected person 265c, and detected person 265d. With respect to FIG. 2, 3D height map 260 may correspond to 3D height map 160 from FIG. 1.

3D height map 260 provides a map of heights detected by using the system shown in FIG. 1, as described above. The 3D height map 260 may be flattened as a simple 2D image with pixel colors and/or intensity indicating relative height as detected by the captured non-visible light. 3D height map 260 may be generated in a manner similar to that of a conventional scanner. One difference is that in a conventional scanner, the object to be scanned remains stationary while the light source moves, whereas in the system shown in FIG. 1, the object or vehicle 140 moves while the light source or non-visible light beam 125 remains stationary. Thus, by taking into account the position, angle, lens parameters, and other viewing characteristics of camera 130, along with the velocity and acceleration of vehicle 140 along vehicle track 145, counting program 137 of computer 135 may utilize the video frames provided by camera 130 to generate a 3D model, or 3D height map 160, which may be rendered as a simple 2D bitmap as shown by 3D height map 260 in FIG. 2.

Moreover, while a conventional scanner may use only a single capture element, the system shown in FIG. 1 may be adapted to use several capture elements, or multiple cameras at different positions and angles, providing a highly accurate 3D model of vehicle 140 and its occupants if desired. Even if only a single camera 130 is utilized, prototype testing has shown that counting accuracy is still within an accurate ±5% error range. However, if highly accurate counting accuracy is desired, multiple cameras may be deployed as well.

As shown in 3D height map 260 in FIG. 2, the four occupants of the vehicle have been correctly detected as indicated by the square overlays indicated by detected person 265a-265d. To detect the presence of a person, various image detection techniques may be utilized. In one embodiment, 3D height map 260 may be scanned for areas with a large approximately circular area of an extended height, which likely indicates the head of a person. To improve the accuracy of this algorithm, two areas immediately adjacent to the detected circular area may be searched, which likely indicates the shoulders of a person. If both a head and two shoulder areas are detected, then the algorithm may indicate the presence of a person.

To further improve accuracy, the above head-shoulder algorithm may limit the number of persons detected within a close proximity to eliminate false double positives. However, for situations where persons may be in very close proximity, such as person 150b sitting in the lap of person 150a in FIG. 1, such limits may be removed or further refined to accommodate such situations. To improve accuracy even further, 3D height map 260 may be compared against another template 3D height map corresponding to the same vehicle without any occupants. Furthermore, if this comparison against a template 3D height map is utilized, then vacant portions of the vehicle may also be detected, providing useful statistical data for optimizing ride capacity, throughput, and efficiency.

Additionally or alternatively, machine-learning methods may be utilized to improve the accuracy of person detection using 3D height map 260. For example, height maps including a child sitting on a lap of their parent may exhibit certain well-known and learnable characteristics that may be trained into the detection system of counting program 137 using machine-learning methods. In this manner, the person detection algorithms may be optimized for test cases that are otherwise difficult for conventional systems to recognize.

Thus, by generating a 3D height map 260 for each vehicle 140 passing along vehicle track 145 through the detection system shown in FIG. 1, accurate counts of vehicle riders may be gathered automatically and with high accuracy. To detect an incoming vehicle 140 for triggering the generation of a corresponding 3D height map 260, various trigger methods may be utilized, such as scanning for a distinctive vehicle front bumper shape using camera 130, by installing a vehicle sensor on vehicle track 145 prior to reaching non-visible light beam 125, by using a time based trigger, or by any other method. After counting program 137 generates the rider count statistics for each vehicle 140, the statistics may be aggregated in a remote database or another storage device (not shown in FIG. 1).

Moving to FIG. 3, FIG. 3 shows a flowchart describing the steps, according to one embodiment of the present invention, by which riders arbitrarily positioned in a vehicle may be counted. Certain details and features have been left out of flowchart 300 that are apparent to a person of ordinary skill in the art. For example, a step may comprise one or more substeps or may involve specialized equipment or materials, as known in the art. While steps 310 through 330 indicated in flowchart 300 are sufficient to describe one embodiment of the present invention, other embodiments of the invention may utilize steps different from those shown in flowchart 300.

Referring to step 310 of flowchart 300 in FIG. 3 and diagram 100 of FIG. 1, step 310 of flowchart 300 comprises computer 135 receiving, from camera 130, video data corresponding to vehicle 140 passing through non-visible light beam 125. As discussed above, non-visible light beam 125 may be generated from a conventional spotlight 110 comprising an incandescent 700-watt spotlight, with filter 115 removing the visible portions of light 120 and structuring the light into a focused beam. Additionally, the video data may be provided in response to a trigger as discussed above, for example by a detection system installed on vehicle track 145. Moreover, while only a single camera 130 is shown in FIG. 1, in alternative embodiments, video data from multiple cameras may be received.

Referring to step 320 of flowchart 300 in FIG. 3, diagram 100 of FIG. 1, and diagram 200 of FIG. 2, step 320 of flowchart 300 comprises computer 135 converting the video data received in step 310 into 3D height map 160, corresponding to 3D height map 260 in FIG. 2. As previously discussed, computer 135 may comprise any off-the-shelf computer. Processor 136 of computer 135 may execute counting program 137 to analyze the incoming video data received from step 310 to generate 3D height map 160, as discussed above. As shown in FIG. 2, the 3D height map 160 may be depicted as a simple 2D bitmap, as shown in 3D height map 260 of FIG. 2, with relative heights indicated by pixel color and/or intensity.

Referring to step 330 of flowchart 300 in FIG. 3, diagram 100 of FIG. 1, and diagram 200 of FIG. 2, step 330 of flowchart 300 comprises computer 135 analyzing 3D height map 260 to determine a number of riders in vehicle 140. As previously discussed, various methods of scanning for persons may be utilized, such as scanning for heads (approximately circular areas of elevated height) and shoulders (lower areas of height adjacent to detected heads). Furthermore, multiple matches within close proximity may be limited to eliminate false positives, and template 3D height maps corresponding to an unoccupied vehicle 140 may be used to provide higher accuracy and to detect vacant portions of vehicle 140. Additionally or alternatively, machine-learning methods may be utilized. Thus, after step 330, detected persons 265a through 265d may be detected and counted, providing an accurate count of the riders in vehicle 140 as well as vacant space if desired. This data may then be collected in a remote database or another data store for future or real-time analysis, allowing amusement park ride operators and other entertainment venues to optimize traffic flow and utilization.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for counting riders positioned in a vehicle having an open top for exposing heads of the riders from above the vehicle, the system comprising:
   a light source structured to provide a focused light beam over the open top of the vehicle;
   at least one camera; and
   a computer having a processor configured to:
      receive, from the at least one camera, video data corresponding to a scan of the vehicle including the riders through the open top of the vehicle exposing the heads of the riders from above the vehicle, as the vehicle passes through the focused light beam;
      convert the video data into a 3D height map; and
      analyze the 3D height map to determine a number of the riders in the vehicle by counting the number of heads shown as being exposed through the open top of the vehicle in the 3D height map.

2. The system of claim 1, wherein the focused light beam is a narrow non-visible light beam extending across a width of the vehicle.

3. The system of claim 1, wherein the focused light beam is infrared light.

4. The system of claim 1, wherein the light source is an incandescent spotlight.

5. The system of claim 1, wherein the processor is configured to analyze the 3D height map to determine the number of the riders in the vehicle by counting approximately circular area of extended height corresponding to the heads of the riders and two adjacent areas of lower heights corresponding to shoulders of the riders.

6. The system of claim 1, wherein the processor is configured to analyze the 3D height map to determine the number of the riders in the vehicle by using machine-learning methods.

7. The system of claim 1, wherein the processor is configured to analyze the 3D height map to determine the number of the riders in the vehicle by further limiting the number of riders detected in a close proximity to eliminate false positives.

8. The system of claim 1, wherein the processor is configured to analyze the 3D height map to determine the number of the riders in the vehicle by further comparing against a template 3D height map of an empty vehicle taken from above the vehicle through the open top of the vehicle.

9. The system of claim 1, wherein the light source is filtered to produce a non-visible light for use as the focused light beam.

10. The system of claim 1, wherein the video data is received in response to a trigger.

11. A method for counting riders positioned in a vehicle having an open ton for exposing heads of the riders from above the vehicle, the method comprising:
    receiving, from at least one camera, video data corresponding to a scan of the vehicle including the riders through the open top of the vehicle exposing the heads of the riders from above the vehicle as the vehicle passes through a focused light beam over the open top of the vehicle produced by a light source;
    converting the video data into a 3D height map; and
    analyzing the 3D height map to determine a number of the riders in the vehicle by counting the number of heads shown as being exposed through the open top of the vehicle in the 3D height map.

12. The method of claim 11, wherein the focused light beam is a narrow non-visible light beam extending across a width of the vehicle.

13. The method of claim 11, wherein the focused light beam is infrared light.

14. The method of claim 11, wherein the light source is an incandescent spotlight.

15. The method of claim 11, wherein the analyzing of the 3D height map determines the number of the riders in the vehicle by counting approximately circular areas of extended height corresponding to the heads of the riders and two adjacent areas of lower heights corresponding to shoulders of the riders.

16. The method of claim 11, wherein the analyzing of the 3D height map determines the number of the riders in the vehicle by using machine-learning methods.

17. The method of claim 11, wherein the analyzing of the 3D height map limits the number of the riders detected in a close proximity to eliminate false positives.

18. The method of claim 11, wherein the analyzing of the 3D height map further compares against a template 3D height map of an empty vehicle taken from above the vehicle through the open top of the vehicle.

19. The method of claim 11 further comprising filtering the light source to produce a non-visible light for use as the focused light beam.

20. The method of claim 11, wherein the video data is received in response to a trigger.

* * * * *

UNITED STATES PATENT AND TRADEMARK OFFICE
CERTIFICATE OF CORRECTION

PATENT NO. : 8,659,643 B2  
APPLICATION NO. : 12/930857  
DATED : February 25, 2014  
INVENTOR(S) : Purvis et al.

Page 1 of 1

It is certified that error appears in the above-identified patent and that said Letters Patent is hereby corrected as shown below:

In the Claims

Column 6, line 25, "ton" should be changed to --top--.

Column 6, line 30, "vehicle as" should be changed to --vehicle, as--.

Signed and Sealed this  
Eleventh Day of November, 2014

Michelle K. Lee  
*Deputy Director of the United States Patent and Trademark Office*